US005479781A

United States Patent [19]

Fric et al.

[11] Patent Number: 5,479,781

[45] Date of Patent: Jan. 2, 1996

[54] LOW EMISSION COMBUSTOR HAVING TANGENTIAL LEAN DIRECT INJECTION

[75] Inventors: Thomas F. Fric, Schenectady; Anil Gulati, Albany, both of N.Y.

[73] Assignee: General Electric Company, Schenectady, N.Y.

[21] Appl. No.: 400,640

[22] Filed: Mar. 7, 1995

Related U.S. Application Data

[63] Continuation of Ser. No. 115,081, Sep. 2, 1993, abandoned.

[51] Int. Cl.[6] .......... F02C 1/00

[52] U.S. Cl. .......... 60/740; 60/755

[58] Field of Search .......... 60/722, 740, 743, 60/746, 748, 755, 759, 760, 39.36; 431/9, 164, 173

[56] References Cited

U.S. PATENT DOCUMENTS

| | | | |
|---|---|---|---|
| 1,591,679 | 6/1926 | Hawley | 60/39.464 |
| 3,099,134 | 7/1963 | Calder et al. | 60/747 |
| 4,257,760 | 3/1981 | Schuurman et al. | 431/173 |
| 4,891,936 | 1/1990 | Shekleton et al. | 60/760 |
| 4,928,479 | 5/1990 | Shekleton et al. | 60/760 |
| 4,928,481 | 5/1990 | Joshi et al. | 60/760 |
| 5,150,570 | 9/1992 | Shekleton | 60/39.36 |
| 5,205,117 | 4/1993 | Shekleton et al. | 60/39.36 |
| 5,263,316 | 11/1993 | Shekleton | 60/39.36 |
| 5,277,021 | 1/1994 | Shekleton | 60/39.36 |
| 5,307,621 | 5/1994 | Glassman et al. | 431/9 |

OTHER PUBLICATIONS

Th. Sattelmayer et al, "Second Generation Low–Emission Combustors for ABB Gas Turbines: Burner Development and Tests at Atmospheric Pressure," 90–GT–162, 1990, pp. 1–9.

G. E. Andrews et al., "Low No Combustor Designs Without Premixing for Aero–Engine Applications," DLR Report 90–01, 1990, pp. 161–174.

*Primary Examiner*—Timothy S. Thorpe
*Attorney, Agent, or Firm*—Paul R. Webb, II

[57] ABSTRACT

Lean direct injection is used in a gas turbine combustor to reduce $NO_x$ emissions. The combustor has a plurality of fuel jets for tangentially injecting fuel and a plurality of air jets for tangentially injecting air therein. The fuel jets and the air jets are preferably disposed in a common cross-sectional plane, although additional groups of fuel and air jets in other planes can be provided. The jets are all evenly spaced and alternate between fuel and air jets. All of the jets preferably point in the same circumferential direction. Alternatively, the jets can be arranged so that all fuel jets are located in a first cross-sectional plane, and all air jets are located in a second cross-sectional plane. Preferably, the fuel jets point in one circumferential direction while the air jets point in the opposite circumferential direction.

3 Claims, 3 Drawing Sheets

LOW EMISSION COMBUSTOR HAVING TANGENTIAL LEAN DIRECT INJECTION

This application is a continuation of application Ser. No. 08/115,081 filed Sep. 2, 1993, now abandoned.

BACKGROUND OF THE INVENTION

This invention relates generally to combustors for gas turbines and more particularly concerns a combustor using lean direct injection for reduced $NO_x$ emissions.

Traditional gas turbine combustors use nonpremixed ("diffusion") flames in which fuel and air freely enter the combustion chamber separately. Typical diffusion flames are dominated by regions which burn at or near stoichiometric conditions. The resulting flame temperatures can exceed 3900° F. Because diatomic nitrogen rapidly disassociates at temperatures exceeding about 3000° F. diffusion flames typically produce unacceptably high levels of $NO_x$ emissions. One method commonly used to reduce peak temperatures (and thereby reduce $NO_x$ emissions) is to inject water or steam into the combustor, but this technique is expensive in terms of process steam or water and can have the undesirable side effect of quenching CO burnout reactions.

Lean premixed injection is a potentially more attractive approach to lowering peak flame temperature than water or steam injection. In lean premixed combustion, fuel and air are premixed in a premixer section, and the fuel-air mixture is injected into a combustion chamber where it is burned. Due to the lean stoichiometry resulting from the premixing, lower flame temperatures, and therefore lower $NO_x$ emissions, are achieved. However, the fuel-air mixture is generally flammable, and undesirable flashback into the premixer section is possible. Furthermore, gas turbine combustors utilizing lean premixed combustion typically require some conversion from premixed to diffusion operation at turndown conditions to maintain a stable flame. Such conversion capability introduces design complexities and generally raises costs.

Accordingly, there is a need for a dry low $NO_x$ combustion system which does not require premixing of fuel and air prior to combustion.

SUMMARY OF THE INVENTION

The above-mentioned need is met by the present invention which employs lean direct injection for obtaining low $NO_x$ emissions. Lean direct injection is defined herein as an injection scheme which separately injects fuel and air directly into the combustion chamber of a combustor with no external premixing. The fuel and air are injected in controlled amounts so as to produce a lean fuel-air equivalence ratio which produces low $NO_x$ emissions. Since there is no premixing region with lean direct injection, concerns of flashback are eliminated, and complex conversion capability is not needed for turndown because the separate injection of fuel and air is similar to diffusion operation. In addition, a lean direct injection combustor is likely to be more compact and lighter than a lean premixed combustor because any premixing section or sections are eliminated.

Specifically, the present invention provides a lean direct injection combustor comprising a housing having a combustion chamber formed therein. A plurality of fuel jets are provided for tangentially injecting fuel into the combustion chamber and a plurality of air jets are provided for tangentially injecting air into the combustion chamber. The fuel jets and the air jets are preferably disposed in a common cross-sectional plane, although additional groupings of fuel and air jets in other planes can be provided. The jets are all evenly spaced about the periphery of the housing so that each one of the fuel jets is between two air jets and each one of the air jets is between two fuel jets. The jets also all point in a single circumferential direction at a given plane.

In another embodiment, a first group of jets is located in a first cross-sectional plane, and a second group of jets is located in a second cross-sectional plane, the second plane being located downstream of the first plane. The first group comprises all air jets, and the second group of jets comprises all fuel jets, or conversely, the first group comprises all fuel jets, and the second group of jets comprises all air jets. In any event, the jets of the first group point in one circumferential direction while the jets of the second group point in the opposite circumferential direction.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
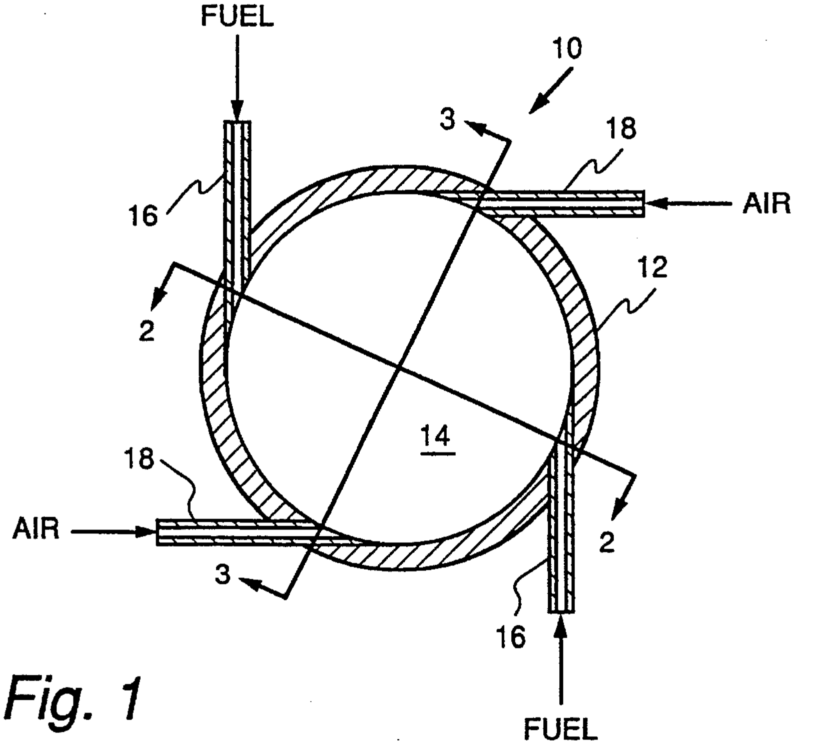
FIG. 1 shows a cross-sectional end view of a lean direct injection combustor of the present invention.
Figure 2:
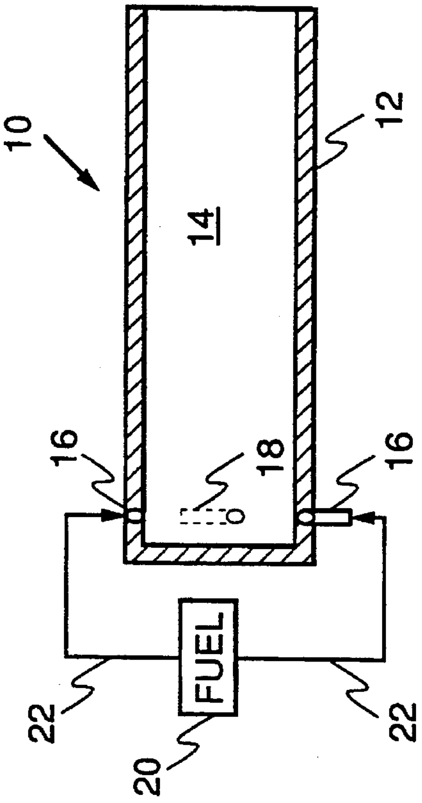
FIG. 2 shows a cross-sectional side view of the lean direct injection combustor of FIG. 1 taken along the line 2—2.
Figure 3:
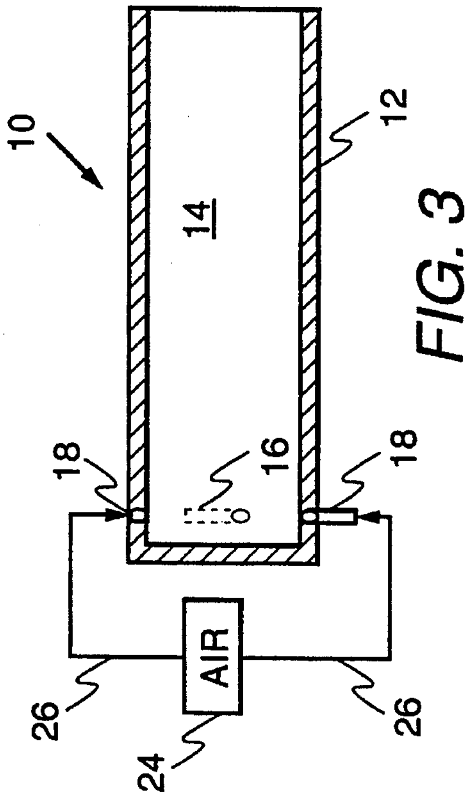
FIG. 3 shows a cross-sectional side view of the lean direct injection combustor of FIG. 1 taken along the line 3—3.

Referring to the drawings wherein identical reference numerals denote the same elements throughout the various views, FIGS. 1–3 show a lean direct injection combustor 10 of the present invention. The combustor 10 comprises a housing 12 which has an open interior defining a combustion chamber 14 therein. The housing 12 is shown in the form of a cylindrical tube but is not necessarily limited to this shape. The combustion chamber 14, which is where fuel is burned, may be protected with a liner (not shown) in some cases. The flow of combustion products exiting the downstream end of the combustion chamber 14 is utilized to drive a turbine.

A plurality of jets or inlets is formed in the cylindrical wall of the housing 12 near the upstream or head end of the combustor 10. The jets are divided into two types: fuel jets 16 and air jets 18. As used herein, the term "jet" refers to an opening from which a stream of fluid is discharged. Thus, by definition, the fuel jets 16 and the air jets 18 discharge fuel and air, respectively, into the combustion chamber 14. The fuel jets 16 and the air jets 18 function independently of one another. That is, fuel and air are injected separately into the combustion chamber 14 without any premixing of fuel and air outside of the combustion chamber 14.

As best shown in FIG. 1, the fuel jets 16 and the air jets 18 are all oriented tangentially to the outer wall of the housing 12 so that air and fuel are tangentially injected into the combustion chamber 14. The tangential injection produces swirl which acts to stabilize the flame. All of the jets 16,18 are preferably disposed in a common plane which is perpendicular to the longitudinal axis of the housing 12 and is thus referred to herein as a cross-sectional plane of the combustor 10. As an alternative to fully lying in a cross-sectional plane, each jet 16,18 can be arranged at an acute angle to a cross-sectional plane (while still being oriented tangentially to the outer wall of the housing 12) so as to partially point downstream. Fuel and air will thus be injected in a downstream direction as well as tangentially. In this case, the points at which the jets 16,18 intersect the housing 12 will preferably be disposed in a common cross-sectional plane.

The jets 16,18 are all arranged to point in the same circumferential direction, i.e., either all counter-clockwise, as shown in FIG. 1, or all clockwise. The jets 16,18 are evenly spaced about the periphery of the combustor housing 12 and alternate between fuel jets 16 and air jets 18. That is, each one of the fuel jets 16 is between two air jets 18 and each one of the air jets 18 is between two fuel jets 16. The alternating injection of fuel and air in the same cross-sectional plane is believed to contribute to quick and intense mixing within the combustion chamber 14. The even spacing of the fuel jets 16 and the air jets 18 about the periphery of the combustor 10 facilitates mixing of the fuel and air in the combustion chamber 14, thereby improving overall efficiency.

Fuel is delivered to the fuel jets 16 from an external source of fuel 20 via fuel lines 22 shown schematically in FIG. 2. Air is delivered to the air jets 18 from a source of air 24, which is typically a compressor, via air lines 26 shown schematically in FIG. 3. Although shown in FIG. 3 as being directly connected to the air jets 18, the air lines 26 can be configured so that the inlet air is first passed over the outer surface of the combustion liner before being injected into the combustion chamber 14 via the air jets 18. Thus, the relatively cool compressor air will provide backside cooling to the liner as is generally known in the art.

FIGS. 1–3 show two fuel jets 16 and two air jets 18 formed in the housing 12. However, the number of fuel jets 16 and air jets 18 is not restricted to this number. There can more or less than the total of four jets in one cross-sectional plane as long as there is an adequate number to provide sufficient amounts of fuel and air to the combustion chamber 14. Preferably, there will be equal number of fuel jets 16 and air jets 18 to permit the alternating distribution of the different types of jets 16,18. In any event, the number of air jets 18 relative to the fuel jets 16 must be sufficient to ensure that fuel and air are injected in the proper proportions for lean combustion. The respective diameters of the jets 16,18 also affects the ratio of fuel and air injected into the combustion chamber 14. Accordingly, the diameter (and thus the cross-sectional area) of the fuel jets 16 is generally 10 smaller than that of the air jets 18 to ensure proper proportions of fuel and air as well as to accommodate pressure drops typical to gas turbines.

While FIGS. 1–3 show one group of jets 16,18 in a common cross-sectional plane, one or more additional groups of tangential fuel and air jets disposed in additional cross-sectional planes may be provided. The additional cross-sectional planes are located slightly downstream from the first cross-sectional plane. As before, the fuel and air jets of each additional group preferably point in the same circumferential direction, are evenly spaced about the periphery of the housing, and alternate between fuel and air jets.

Figure 4:
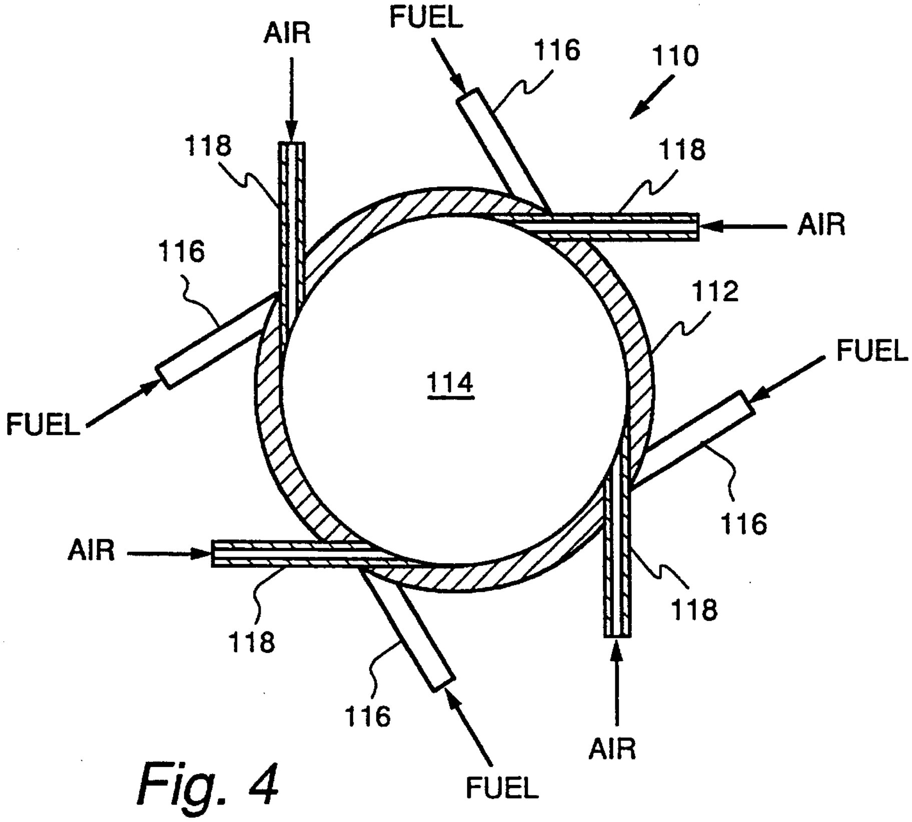
FIG. 4 shows a cross-sectional end view of a second embodiment of the present invention.
Figure 5:
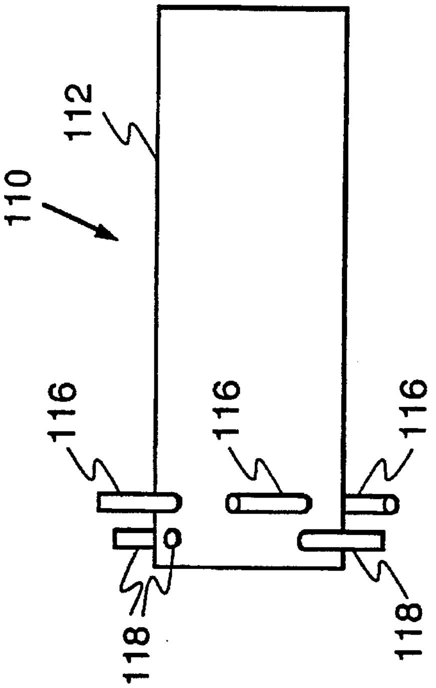
FIG. 5 shows a side view of the lean direct injection combustor of FIG. 4.

FIGS. 4 and 5 show a lean direct injection combustor 110 which represents a second embodiment of the present invention. The combustor 110 comprises a housing 112 which has an open interior defining a combustion chamber 114 therein. A plurality of jets is formed in the outer wall of the housing 112 near the upstream or head end of the combustor 110. The jets are arranged into two groups: a group of four fuel jets 116 and a group of four air jets 118. While each of the two groups is shown to have four jets, the present invention is not so limited. There can more or less than four jets in each group as long as sufficient amounts of fuel and air are injected into the combustion chamber 114. There need not be an equal number of fuel jets 116 and air jets 118, although this is generally preferred. In any event, the number of air jets 118 relative to the fuel jets 116 must be sufficient to ensure that fuel and air are injected in the proper proportions for lean combustion. Moreover, the diameter (and thus the cross-sectional area) of the fuel jets 116 is generally smaller than that of the air jets 118 to ensure proper proportions of fuel and air as well as to accommodate pressure drops typical to gas turbines.

The fuel jets 116 and the air jets 118 are all oriented tangentially to the outer wall of the housing 112 so that air and fuel are tangentially injected into the combustion chamber 114, thereby producing swirl which acts to stabilize the flame. As best seen in FIG. 5, the air jets 118 are all disposed in a first cross-sectional plane, and the fuel jets 116 are all disposed in a second cross-sectional plane, located slightly downstream from the first plane. Conversely, the fuel jets 116 could be located upstream from the air jets 118. In addition to being oriented tangentially to the outer wall of the housing 112, each jet 116,118 can be arranged to either lie in the respective cross-sectional plane or be at an acute, downstream angle thereto. In either case, the points at which the jets 116,118 intersect the housing 12 will preferably be disposed in a common cross-sectional plane.

The fuel jets 116 and the air jets 118 are preferably, but not necessarily, arranged to point in opposite circumferential directions. That is, the fuel jets 116 all point clockwise, and the air jets 18 all point counter-clockwise as shown in FIG. 4, although these directions could be reversed. The fuel jets 116 and the air 118 are evenly spaced about the periphery of the combustor housing 112 in their respective cross-sectional planes. The even spacing of the jets 116,118 about the periphery of the combustor 10 facilitates mixing of the fuel and air in the combustion chamber 114, thereby improving overall efficiency.

Figure 6:
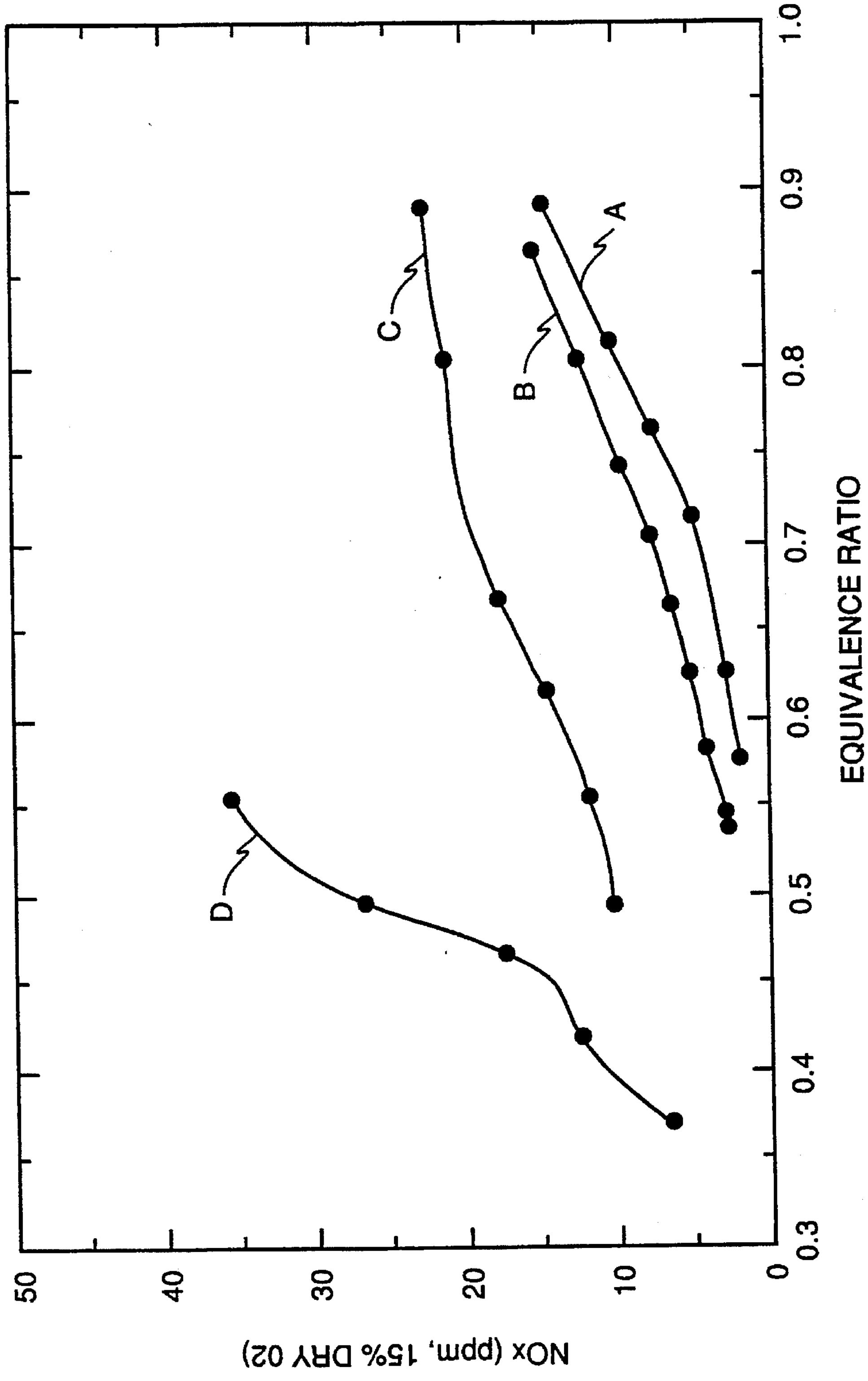
FIG. 6 is a graph comparing the level of $NO_x$ emissions as a function of fuel-air equivalence ratio from experimental lean direct injection combustors of the present invention to the $NO_x$ emissions from a lean premixed combustor.

The concept of the present invention was tested on a laboratory-scale device simulating the lean direct injection combustors of the present invention. The experiments were performed under atmospheric pressure with no preheating of air and used methane for fuel. The results are shown in FIG. 6 which is a graph plotting $NO_x$ emissions in parts per million against the fuel-air equivalence ratio. Curve A shows premixed combustion data derived by tangentially injecting premixed fuel and air into the combustion chamber of the laboratory-scale device. Curve B shows combustion data derived from a laboratory-scale device simulating the combustor of FIGS. 1–3. Curves C and D show combustion data derived from a laboratory-scale device simulating the combustor of FIGS. 4 and 5; the data of curve C being collected using two fuel jets and two air jets, the data of curve D being collected using four fuel jets and four air jets. The results show the $NO_x$ emissions to be below 20 ppm for a wide range of lean equivalence ratios. The lean direct injection of the embodiment of FIGS. 1–3 (curve B) compares quite favorably to that of the lean premixed combustion.

The foregoing has described a lean direct injection combustor which can provide low $NO_x$ emissions without premixing air and fuel outside of the combustion chamber. While specific embodiments of the present invention have been described, it will be apparent to those skilled in the art that various modifications thereto can be made without departing from the spirit and scope of the invention as defined in the appended claims.

What is claimed is:

1. A combustor comprising:

a housing defining a combustion chamber;

a plurality of fuel jets disposed tangentially to said housing for injecting only fuel into said combustion chamber; and a plurality of air Jets disposed tangentially to said housing for injecting air into said combustion chamber, said plurality of fuel Jets and said plurality of air jets being disposed in a common cross-sectional plane with said fuel jets and said air jets being alternately and evenly spaced about the periphery of said housing so that each one of said fuel Jets is between and adjacent to two air Jets and each one of said air jets is between and adjacent to two fuel jets.

2. The combustor of claim 1 wherein said fuel jets and said air jets all point in a single circumferential direction.

3. The combustor of claim 1 wherein said fuel jets have a smaller cross-sectional area than said air jets.

* * * * *